Aug. 23, 1927. L. G. FREEMAN Re. 16,710.

SHANK BEATING AND STITCH RUBBING MACHINE

Original Filed Nov. 16, 1921 3 Sheets-Sheet 1

Inventor
Louis G. Freeman
by James R. Hodder
Attorney

Aug. 23, 1927. Re. 16,710

L. G. FREEMAN

SHANK BEATING AND STITCH RUBBING MACHINE

Original Filed Nov. 16, 1921 3 Sheets-Sheet 2

Inventor
Louis G. Freeman
by James R. Hodda
Attorney

Aug. 23, 1927. Re. 16,710

L. G. FREEMAN

SHANK BEATING AND STITCH RUBBING MACHINE

Original Filed Nov. 16, 1921 3 Sheets-Sheet 3

Inventor
Louis G. Freeman
by James R. Hodder
Attorney

Reissued Aug. 23, 1927. Re. 16,710

UNITED STATES PATENT OFFICE.

LOUIS G. FREEMAN, OF CINCINNATI, OHIO, ASSIGNOR TO LOUIS G. FREEMAN AND CHARLES F. FREEMAN, TRUSTEES, BOTH OF CINCINNATI, OHIO.

SHANK-BEATING AND STITCH-RUBBING MACHINE.

Original No. 1,521,877, dated January 6, 1925, Serial No. 515,668 filed November 16, 1921. Application for reissue filed November 23, 1926. Serial No. 150,359.

My present invention relates to shoe machinery, and more particularly to a shank beating and stitch rubbing machine applicable for finishing the shanks of welted boots and shoes.

This invention is particularly applicable for beating down shoe shanks, especially in welt shoes, where a close shank is desirable, and is also applicable where it is desired to rub down the stitches before the channels are closed. While desirable in the above particular situations, it may be used also in any situation in which a beating down or rubbing operation is to be performed. In machines of this character as heretofore constructed, it was customary to have different shaped beating irons fastened on the end of a shaft adapted to rotate at the proper speed and the shank of the shoe held against it to beat down the edge of the sole at the shank close to the upper, and this same operation was utilized in rubbing down stitches. This operation was difficult to perform, however, as it was difficult to hold the shoe in proper position and to move it quickly while simultaneously pressing hard to perform the work. Applying pressure to the work was very apt to cause the shoe to slip out of position and was the source of injury to the shoe, this accident happening frequently, especially to new and inexperienced operators.

I have overcome the above named difficulties with my present invention by the provision of an edge guide associated with the beating iron and so constructed that it will not injure a shoe even though the shoe slides or slips over the same, and also by the provision of a guard with a concave clearance possible injury to the shoe is prevented.

The principal object of my present invention, therefore, is an improved shank beating and stitch rubbing machine.

Another object is an improved guiding means for preventing injury to shoes during the shank beating and stitch rubbing operations.

Still another object is an improved beating iron.

A further object is an improved rotary concave end guard.

In the accompanying drawings illustrating the preferred embodiment of my invention, Fig. 1 is a front elevation of a machine to which my invention has been applied;

Figure 1:
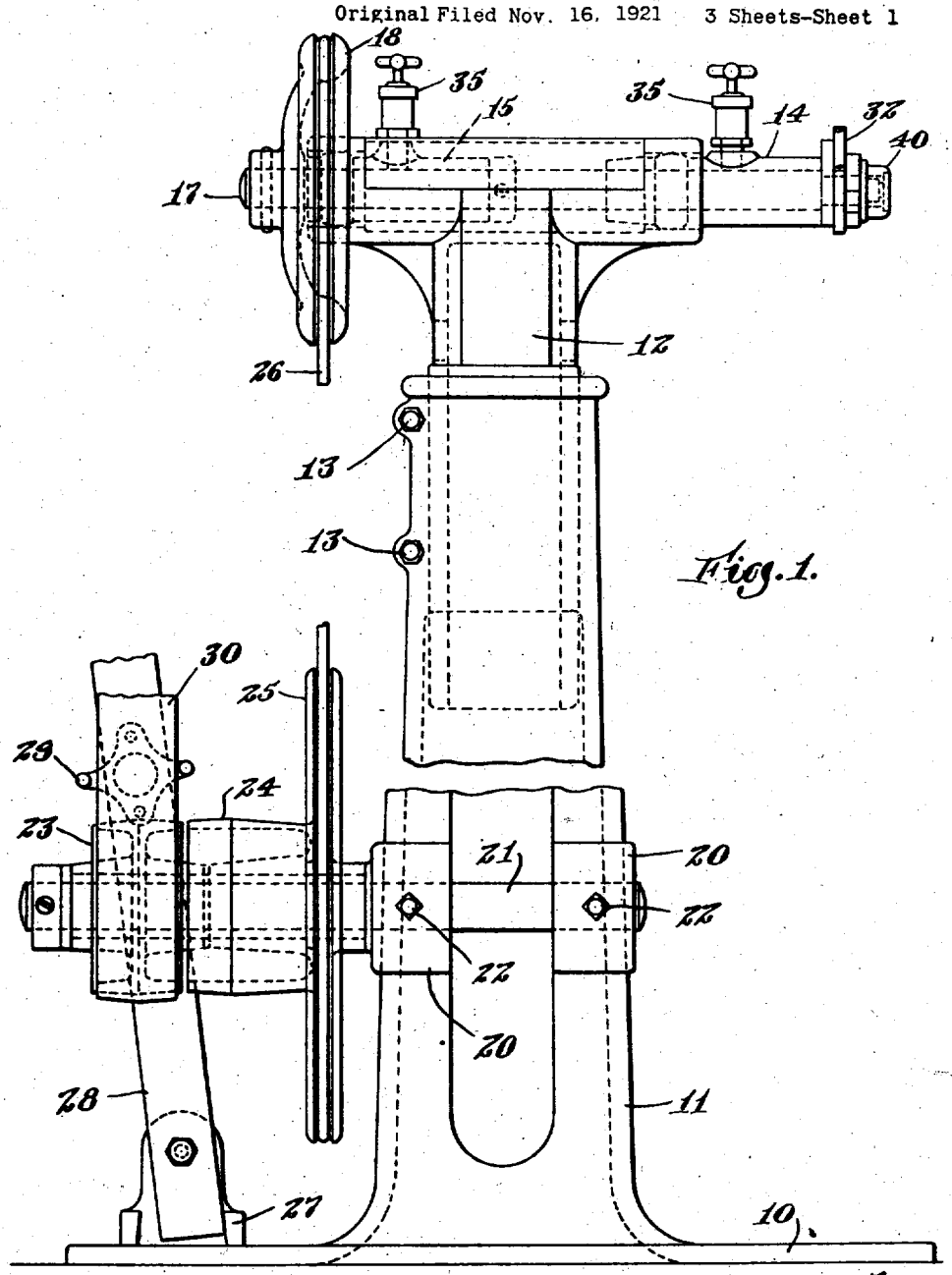
Figure 2:
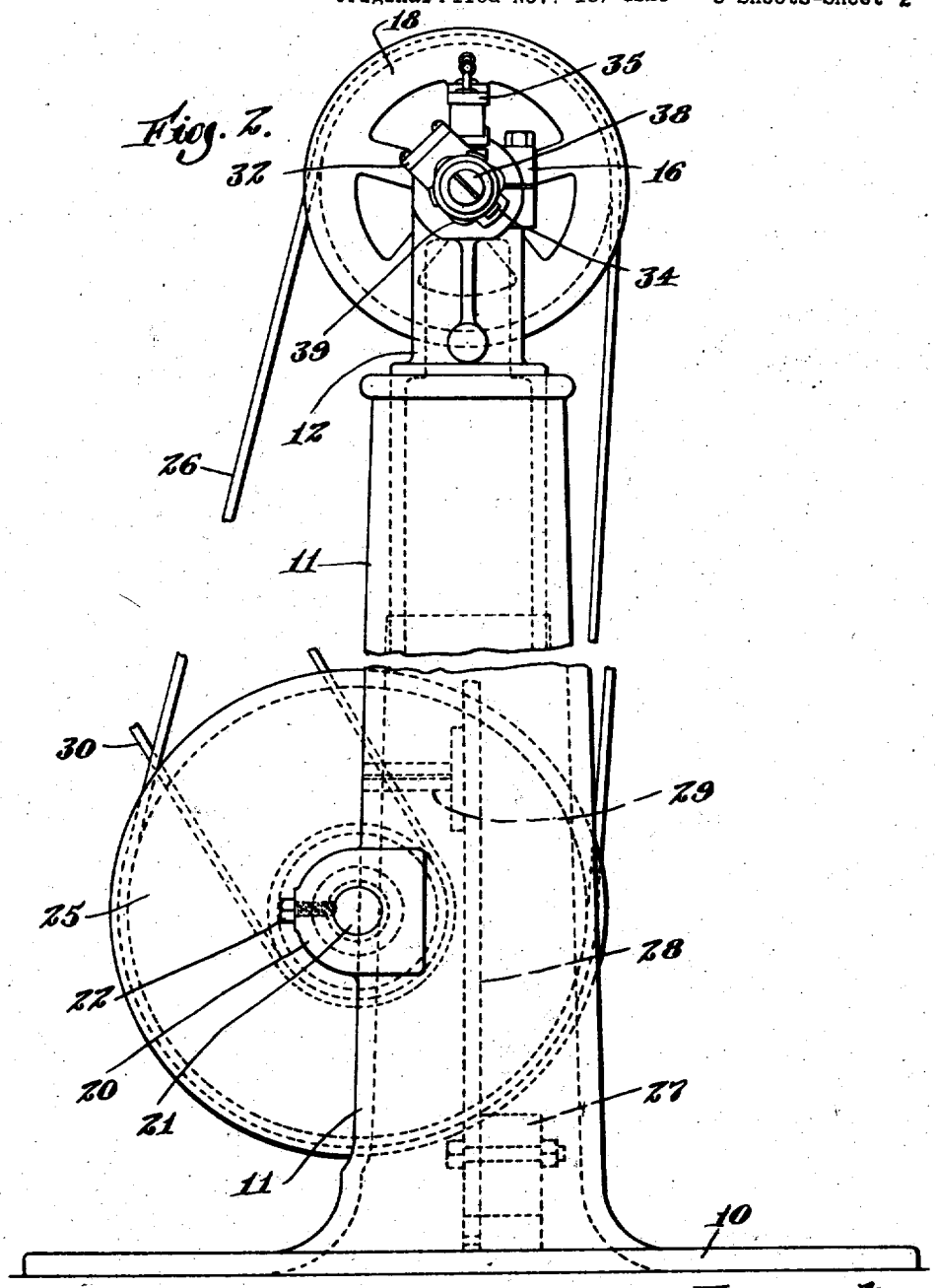
Fig. 2 is an end elevation.
Figure 3:
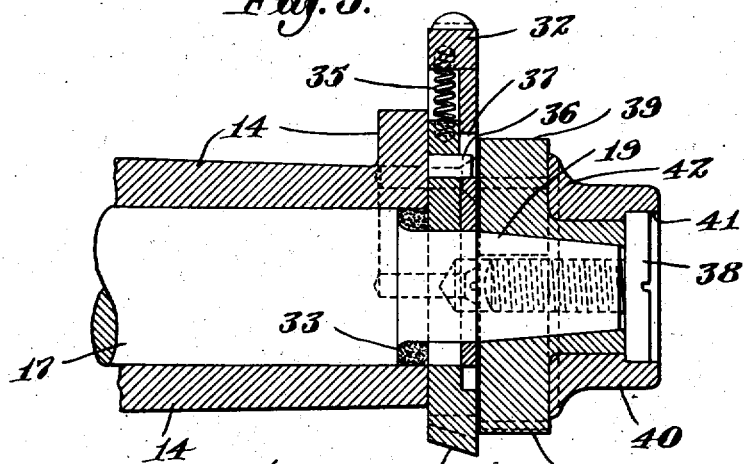
Fig. 3 is a vertical longitudinal section through the shank beating and stitch rubbing head.
Figure 4:
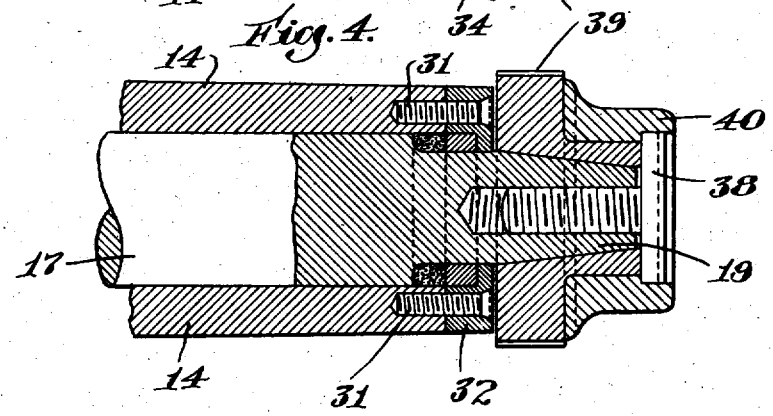
Fig. 4 is a horizontal longitudinal section through the shank beating and stitch rubbing head.
Figure 5:
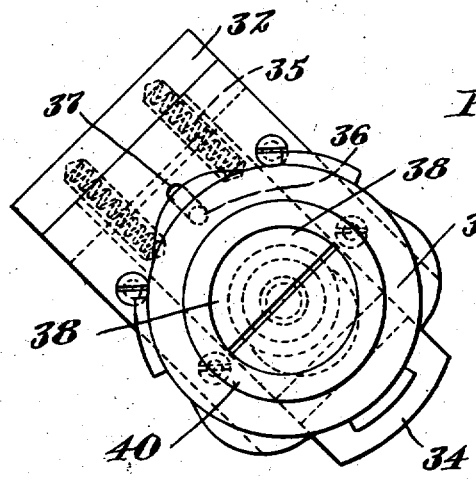
Fig. 5 is a front elevation of the device shown in Figs. 3 and 4.

Referring to the drawings, 10 designates a base having a pedestal 11 formed integral therewith, and slidably mounted for vertical movement in said pedestal is a head 12, bolts 13 in the pedestal operating to hold the head 12 in any desired adjusted position. Boxes 14 and 15 are held in the head 12 in split bosses, but one of which, 16, is shown, this arrangement allowing for endwise movement of the boxes 14 and 15, and in addition, in the case of the box 14, such arrangement allows for angular adjustment. This latter is particularly advantageous, as it enables the relative position of the devices carried by the box 14 to be adjusted to the particular operator; that is, different operators force the work into engagement with the operating tool at different angles and it is essential that an operator, who, for example, lifts the work upward and rearward toward himself, be able to adjust the working parts of the apparatus to accommodate the direction in which he pulls the work. Rotatably mounted in the boxes 14 and 15 is a shaft 17, provided at one end with a driving pulley 18, the other end being tapered, as shown at 19.

Intermediate the ends of the pedestal 11 are bosses 20 drilled to receive the end of a shaft 21, this shaft being held in position by bolts 22. The free end of this shaft 21 carries an idler pulley 23 and a driving pulley 24, a pulley 25 being attached to the driving pulley 24. The pulley 25 is in verical alinement with the pulley 18 on the shaft 17 and a belt 26 passes over the same to rotate the shaft 17 and attached parts. A boss 27 formed integral with the base 10 has pivotally mounted therein the lower end of a belt shift rod 28, forked arms 29 attached to the rod engaging the sides of a driving belt 30, which extends from any suitable source of power over the pulley.

Secured to the free or exposed end of the box 14, by screws 31, is a guide carrier 32, this guide carrier being perforated to allow free rotation of the shaft 17. Surrounding the reduced end of the shaft 17 and in the rear of the guide carrier 32 is a felt packing 33, the purpose of which is to prevent oil or other lubricant from seeping through the box 14 and onto the shoe being operated on. Slidably mounted in the guide carrier 32 is a guide 34, the outer end of which is rounded to follow the diameter of the beating iron. This guide 34 is forced outwardly of the guide carrier 32 by springs 35, a pin 36 in the guide 34 working in a slot 37 in the guide carrier 32 limiting the outward, as well as the inward movement. Fitting upon the tapered end 19 of the shaft 17, and held thereon by a screw 38, is a beater iron 39. The outer end of the beater iron 39 is reduced in diameter to receive a guard 40, which is countersunk at 41 to a depth and diameter sufficient to receive and cover the screw 38, thereby preventing possible injury to the work. This guard 40 is reduced in diameter at 42 to clear the channel leaf of a shoe so as to allow full pressure of the beating iron 39 to become effective and at the same time prevent damage to the shoe being worked upon, in case the operator moves the shoe out of operative position. The beating iron 39 is made with a taper hole, thereby strengthening the end of the shaft 17 and avoiding the breaking of such shaft on account of the pressure that is continually being applied against it during the operation of the machine. These beating irons may be made in different widths to suit the work and the working edges slightly rounded to avoid scuffing. The great advantage of having the guide 34 movable as to depth is that the thickness of the edge of the sole varies from a feather edge to one-eighth of an inch or more in thickness. The lip of the guide extending about one-eighth of an inch allows for a ready locating of position of the shoe for operating on and yielding readily to pressure does not interfere with the beating iron getting down to work regardless of whether the leaf is thick or thin, as the guide does not revolve, it is easier to hold the shoe in proper position when moving it during the beating and stitch rubbing operations. The guiding edges of the guide, both front and bottom are rounded to allow for moving the shoe to follow the contour or shank of the shoe. This cannot be done on a rotary guide, on account of the danger of damaging the upper if the shoe slips out of position.

In operating, to beat down the shank of the shoe close to the upper, the edge of the sole at the shank is pressed at the proper angle against the beating iron which is revolving at the proper speed and is positioned laterally by the guide, which is easily located and kept in contact with the shoe. The operator beats down the shank and before replacing the shoe also rubs down the stitches, doing both operations with one handling of the shoe.

While I have described the preferred embodiment of my invention somewhat in detail, it is to be understood that I may vary the size shape and arrangement of parts, constituting my invention within wide limits without departing from the spirit of the invention.

Having thus described my invention, what I claim as new is:

1. In a shank beating and stitch rubbing machine, the combination of a bearing, a guide carrier attached to the end of the bearing, a shaft rotatably mounted in the bearing and extending through the guide carrier, a beating iron attached to said shaft, a guide slidably mounted in said guide carried and extending outwardly beyond the periphery of the beating iron, and means for yieldingly holding the guide in position.

2. In a shank beating and stitch rubbing machine, the combination of a bearing, a guide carrier attached to the end of the bearing, a shaft rotatably mounted in the bearing and extending through the guide carrier, a beating iron attached to said shaft, a guide slidably mounted in said guide carrier and extending outwardly beyond the periphery of the beating iron, means for yieldingly holding the guide in position, and a guard mounted on the end of the beating iron.

3. In a shank beating and stitch rubbing machine, the combination of a bearing member, a rotatable beating iron, and a slidably mounted spring pressed guide on the bearing member and co-operating with the beating iron.

4. In a shank beating and stitch rubbing machine, a bearing member, a stationary guide carrier mounted thereon, a guide slidably mounted on said carrier, means for resiliently holding said guide in outward position, and means for limiting the extent of movement of the guide.

5. In a shank beating and stitch rubbing machine, the combination of a bearing, a guard provided with a reduced end mounted thereon and co-operating therewith, a beating iron, and a spring pressed guide movable radially with respect to the beating iron.

6. In a shank beating and stitch rubbing machine, the combination of a bearing, a guide carrier attached to the end of the bearing, a guide carried thereby, a shaft rotatably mounted in the bearing and extending through the guide carrier, and means for adjustably holding said bearing in any desired angular position with respect to the shaft.

7. In a stitch beating and rubbing machine, the combination of a rotatable beating iron, and a channel flap guard associated with said beating iron and provided with a reduced portion for clearing the channel flap of a shoe being worked on, whereby full pressure of the beating iron may be employed without danger of injury to the channel flap.

8. In a stitch beating and rubbing machine, the combination of a rotatable beating iron, a guide located adjacent said beating iron for engaging the edge of the sole of a shoe to properly position the beating iron in the sole channel, and a guard located opposite the guide, said guard having a reduced portion to provide clearance for the channel flap while the shoe is being worked on.

9. A shank beating and stitch rubbing machine, having in combination a guide, a beating iron, and a channel flap guard, said guide being adapted to engage the sole edge of a shoe.

10. A machine of the kind described, comprising sole beating means, channel flap clearing means, and guiding means adapted to engage the edge portion of the shoe.

11. A machine of the kind described, comprising sole beating means, channel flap clearing means, and guiding means adapted to engage the edge portion of the shoe sole.

12. A machine of the kind described comprising shoe edge engaging means, channel flap clearing means, and beating means.

13. A machine of the kind described, comprising sole edge engaging means, channel flap protecting means, and beating means.

14. A machine of the kind described, comprising a sole and shoe edge engaging means, channel flap clearing means, and beating means.

15. A machine of the kind described, having a beating tool in combination with guiding means to determine the relative position of the tool and shoe to be operated upon, said means engaging the outer shoe edge surface, and means attached to said beating tool providing a protecting clearance.

In testimony whereof, I have signed my name to this specification.

LOUIS G. FREEMAN.